United States Patent

[11] 3,631,508

[72] Inventor Dimitri N. Staicopolus
Wilmington, Del.
[21] Appl. No. 44,110
[22] Filed June 8, 1970
[45] Patented Dec. 28, 1971
[73] Assignee E. I. du Pont de Nemours and Company
Wilmington, Del.

[54] THERMOMAGNETIC RECORDING WHEREBY IMAGE REVERSAL IS ACHIEVED MAGNETICALLY
6 Claims, 8 Drawing Figs.

[52] U.S. Cl. .......... 346/74 MP, 101/DIG. 13, 346/74 MT
[51] Int. Cl. .......... G03g 19/00
[50] Field of Search .......... 346/74 M, 74 MP, 74 MT; 101/DIG. 13; 178/6.6 A; 235/61.114, 61.12 M; 179/100.2 K

[56] References Cited
UNITED STATES PATENTS
2,430,457 11/1947 Dimond .......... 346/74 MP
3,465,317 9/1969 Rabinow et al. .......... 346/74 MP X
OTHER REFERENCES
IBM Technical Note, Vol. 3, No. 2, July 1960, pp. 22-23

*Primary Examiner*—Robert L. Richardson
*Attorney*—D. R. J. Boyd

ABSTRACT: A magnetic image, recorded on a magnetic recording member having a finely particulate hard magnetic material as its magnetic working material, is changed by application of a magnetic field to demagnetize areas of the recording member having maximum magnetization opposed to the field, while other areas are magnetized or enhanced in magnetization in the direction of the field. Thus a recording member magnetized to print a black on white image can be reversed to print a white on black image.

INVENTOR
DIMITRI N. STAICOPOLUS
BY
ATTORNEY

INVENTOR
DIMITRI N. STAICOPOLUS

BY D R Boyd

ATTORNEY

THERMOMAGNETIC RECORDING WHEREBY IMAGE REVERSAL IS ACHIEVED MAGNETICALLY

FIELD OF THE INVENTION

This invention relates to a method for changing magnetic images recorded on magnetic recording members having as their working medium a layer of fine magnetic particles.

BACKGROUND OF THE INVENTION

Magnetic images composed of differing areas of magnetization on a magnetic recording member are useful for printing. In this process, the magnetic image is decorated with a magnetic ink or toner which adheres most strongly to the magnetized areas and which can then be transferred to paper or the like and if necessary, suitably fixed.

Various methods are known for forming such magnetic images both in the form of binary type or "black and white" images and in the form of "continuous tone" images. In the former type of image, the magnetic recording member contains two types of magnetic areas corresponding to black and white. In the latter type, "continuous tone" images, the different tones are represented by differing degrees of magnetization, the magnetic particles employed to decorate and print the recording member in concentration roughly proportional to the magnetization.

The magnetic recording member or printing plate which is employed for magnetic printing generally has as the working magnetic medium a layer of finely particulate hard magnetic material which is bound to the substrate with a binder. The layer may be an essentially continuous layer as with conventional magnetic tape for audio recording, or the layer may be patterned in a regular or irregular manner to enhance the magnetic field due to the magnetization of the elements and to permit the passage of light through the magnetic member (since magnetic materials are generally highly opaque) for use in reflex copying. The patterning should be finer than the desired optical resolution of the printed image. For the purpose of the present invention, it is essential that the magnetic recording member has as its working magnetic medium fine particles of magnetic material for reasons which will appear hereinafter.

Various methods are known for forming magnetic images on the aforesaid recording members. For example a magnetic stylus having its end shaped in the form of the desired character can be placed in contact with the magnetic recording member which is thereby correspondingly magnetized. If necessary, a collapsing AC magnetic field or the like can be employed in conjunction with the magnetized stylus to assist the transfer of the magnetic pattern. A preferred class of magnetic imaging techniques can be described generically as Curie point writing or thermomagnetic recording. With suitable recording members such techniques can be employed to form magnetic images corresponding to images printed on paper, photographic transparencies or the like, either in continuous tone or in black and white (including half-tone) images.

For forming magnetic images by Curie point writing, it is desirable that the finely particulate magnetic material of the magnetic recording member should have a relatively low Curie temperature; preferably below 300° C. The magnetic material of the recording member is transiently imagewise heated by radiation to the vicinity of the Curie temperature, and in the heating cycle the magnetic condition of the recording member is changed to record the image. The radiation employed to heat the recording member transiently to the vicinity of the Curie temperature is generally light in or near the visible region of the spectrum which is imagewise modulated by transmission through a photographic transparency. If a structured recording member with a transparent substrate is employed, the radiation can be modulated by reflection from a suitable document having areas of differing reflectivity. In this reflex method the document is placed essentially in contact with the recording member and the radiation is passed through the recording member to which it imparts a thermal bias and is then modulated and reflected back to the member to imagewise heat the same.

When visible light is employed, it is generally applied as a small flash of radiation. However, the recording member can be scanned by a moving spot of light in the form of a roster, and the flying spot can be modulated to imagewise transiently heat small areas of the recording member sequentially rather than concurrently. A modulated electron beam can also be employed to imagewise transiently heat the recording member.

In general, three combinations of transient heating and magnetic field can be used to form the magnetic image:

i. the magnetic recording member is uniformly premagnetized prior to exposure, and is exposed to the radiation in the substantial absence of an external magnetic field so that the recording member is imagewise demagnetized:

ii. the magnetic recording member is initially demagnetized and is exposed to the radiation in the presence of a magnetic field having a field strength insufficient to magnetize the magnetic material of the recording member at the bias temperature so that the recording member is imagewise magnetized by the transient imagewise heating;

iii. the magnetic recording member is initially magnetized and then is exposed to the radiation in the presence of a magnetic field directed to oppose the direction of premagnetization and having a strength insufficient to magnetize the magnetic material of the recording member at the bias temperature, so that the portions of the recorded member heated by the radiation are magnetized in the reverse direction to portions which are not so heated.

The remanent magnetization of magnetized assemblies of particulate magnetic materials remains substantially constant on transient heating to temperatures close to the Curie temperature. Over a short temperature interval, which can be called the Curie range, the remanent magnetization measured after transient heating decreases with increasing temperatures and at or above the Curie temperature the remanent magnetization is zero. Thus, if the differential heating of the magnetic material which forms the magnetic image is in the Curie range, a continuous tone image can be formed. The range can be adjusted by thermal bias in addition to the transient imagewise heating by the radiation. The bias can be achieved either by adjusting the initial temperature of the recording member or by a uniform transient heating concurrent with the imaging radiation.

Similar considerations apply to the magnetization of a magnetic recording member by transient heating in the presence of a magnetic field.

It will be evident that different results can be achieved depending on the method employed to form the image. Thus in the above thermomagnetic methods of forming an image on a magnetic recording member, the demagnetization of a premagnetized recording member produces an image which is reversed compared with the image formed by magnetization of an initially unmagnetized recording member. Accordingly, it is desirable to provide a simple method for changing a magnetic image composed of magnetized areas on an unmagnetized ground to its negative image, i.e., unmagnetized areas on an unmagnetized ground, and vice versa. Furthermore, when a magnetic printing plate is prepared from a document for copying purposes, it is sometimes desirable to obtain the reversed image, i.e., if the original is composed of white lettering on a black ground it may be desired to obtain copies which are composed of black lettering on a white ground.

SUMMARY OF THE INVENTION

Accordingly, the present invention can be defined as a method of changing magnetic images composed of areas of differing magnetization on a magnetic recording member, the magnetic vector of each of the areas of magnetization being aligned parallel to a predetermined line, by applying to each portion of the magnetic layer of the recording member at least once to a unidirectional magnetic field directed along the predetermined line having a strength about equal to the coercivity of the magnetic layer and opposed in direction to at least some of the magnetic vectors of said areas.

For reasons which will be discussed hereinafter, it is essential that the magnetic working layer of the magnetic recording member be composed of finely particulate hard magnetic material.

THE DRAWINGS AND DETAILED DESCRIPTION OF THE INVENTION

This invention will be better understood by reference to the drawings which occupy the application. In these drawings.

Figure 1:
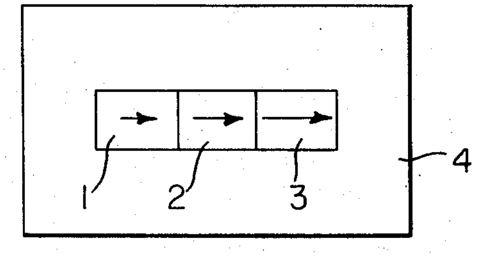
FIG. 1 is a schematic view of a magnetic recording member having a magnetic image thereon.
Figure 2:
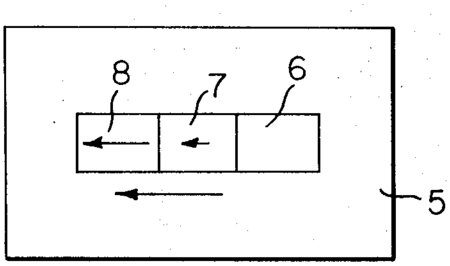
FIG. 2 is a schematic view of the magnetic recording member of FIG. 1 after application of a magnetic field according to the process of the present invention.

Referring now to the drawings, FIG. 1 shows a schematic view of a magnetic recording member having a magnetic image thereon composed of adjacent squares 1, 2, and 3 which are magnetized to differing degrees on an unmagnetized ground 4. The direction of magnetization of the different areas outlined is shown in each instance by an arrow, the length of the arrow being proportional to the degree of magnetization. The changes of magnetization of the various areas comprising the magnetic image after application of a magnetic field directed opposite to each of the magnetic vectors indicated by the arrows is shown in FIG. 2. In that figure the background, 5, corresponding to 4 in FIG. 1 is magnetized. Area 6 corresponding to area 3 of FIG. 1 is demagnetized, while area 7 corresponding to area 2 of FIG. 1, and area 8 corresponding to area 1 of FIG. 1 are partially magnetized. Thus the magnetic image of FIG. 2 is reversed compared with FIG. 1.

In the case illustrated by FIG. 2 the magnetic field is applied to the magnetic recording member in a direction opposed to the magnetic vector of all of the areas of magnetization.

Figure 3:
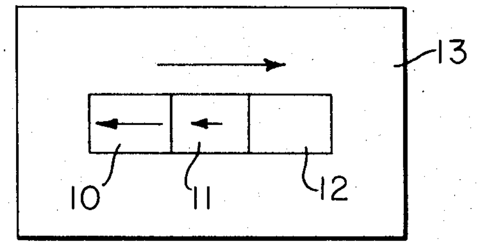
FIG. 3 is a schematic view of a magnetic recording member having a magnetic image thereon composed of areas of reverse magnetization.
Figure 4:
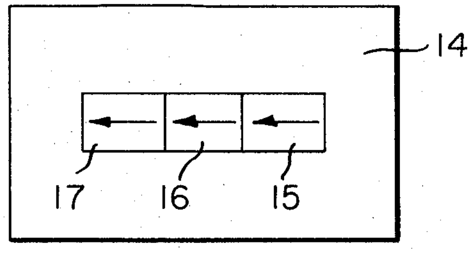
FIG. 4 is a schematic view of the magnetic recording member of FIG. 3 after treatment with a magnetic field according to this invention.
Figures 5, 6, 7:
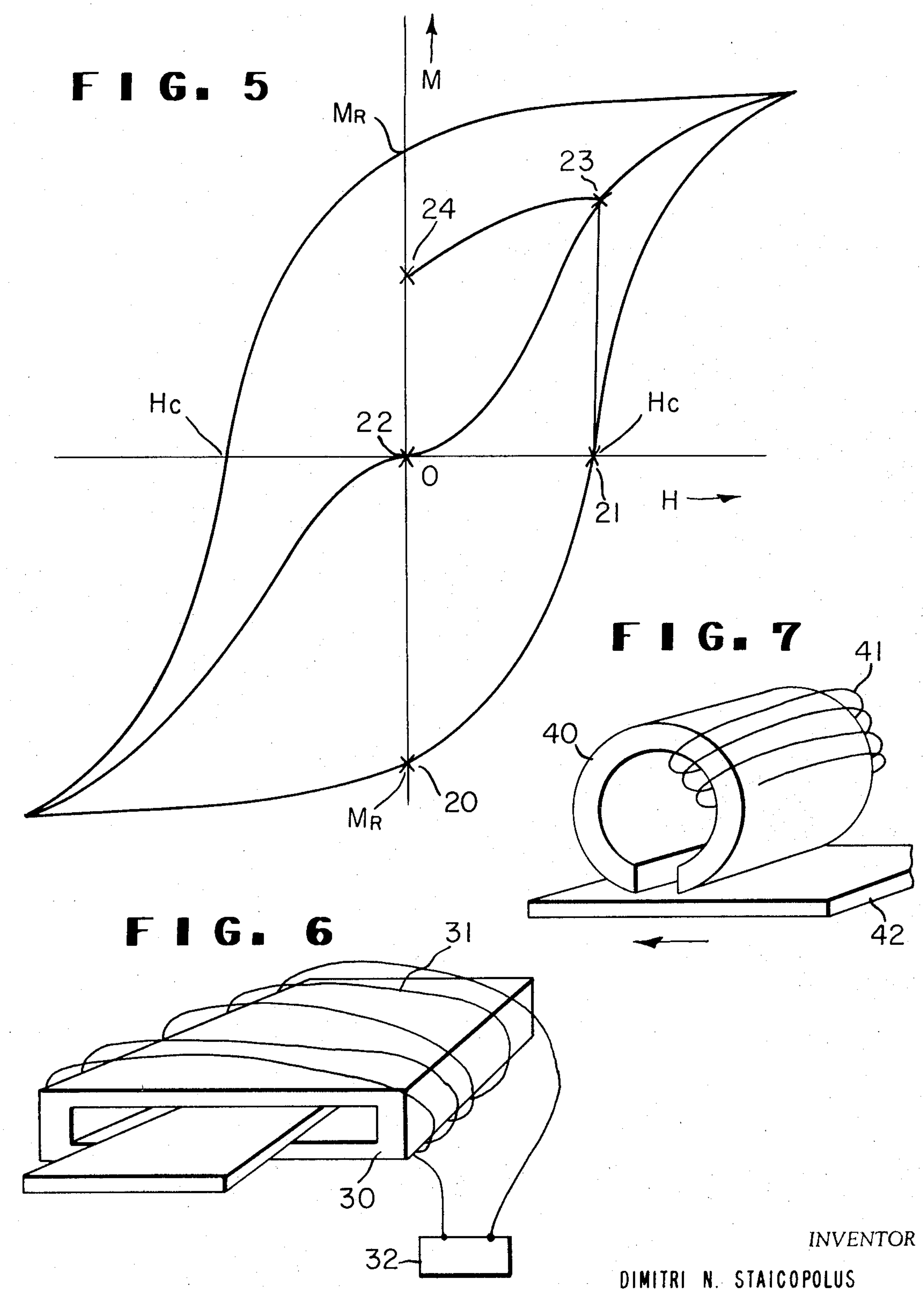
FIG. 5 shows a hysteresis loop of magnetization field of a magnetic recording member which is intended to assist in understanding this invention.
FIG. 6 illustrates one form of apparatus which can be employed in the practice of this invention.
FIG. 7 illustrates another apparatus which can be employed in the practice of this invention.

FIG. 3 and FIG. 4 illustrate the application of the process of this invention to a magnetic image composed of areas 10 and 11 having various degrees of magnetization in a given direction and areas such as 12 which are demagnetized on a background 13 which is magnetized in a direction opposite to the direction of magnetization. The direction and magnitude of the magnetization of the various areas of the recording member is indicated by arrows in FIG. 1 and FIG. 2. If the magnetic recording member is treated with a magnetic field directed to oppose the magnetization of the background, the resultant pattern of magnetization is shown in FIG. 4. In this case, the background 14 corresponding to 13 of FIG. 3 is demagnetized. Area 15 corresponding to 12 is magnetized and the areas 16 and 17 corresponding to 11 and 10 respectively are increased in magnetization towards saturation. FIG. 5 is a diagram of a hysteresis loop for the magnetic working material of a recording member in which the magnetization ($B-H=M$ is plotted against the field H. If the magnetized portions of the recording member are substantially saturated, i.e., magnetized to their maximum value $M_r$ corresponding to point 20 on the curve. On application of a field $H_c$ equal to the coercivity, the magnetization is reduced to zero, represented by point 21 on the curve. For the unmagnetized areas of the recording member, the magnetization is represented by the point 22 at the origin of the hysteresis curve. On application of a magnetic field having a strength $H_c$ the previously unmagnetized areas follow the initial magnetization curve to point 23, and on removal of the field return to the point 24.

From the above, it will be seen that there is some loss of magnetization accompanying the reversal of magnetization by application of a magnetic field. Surprisingly, however, it has been found that reversal can be accomplished as many as 16 times to produce magnetic images which are still suitable for printing.

FIG. 6 shows apparatus which can be employed to change a magnetic image composed of areas of differing magnetization. A former in the form of a rectangular open-ended box 30 made of nonmagnetic material is wound with a coil of wire and connected to a DC power supply 32. The recording member 33 having as its working material a finely particulate hard magnetic material can be inserted into the slot-shaped central opening of the coil.

Thus a former having an aperture of 2¼×3¼ inches rectangular cross section and 2¾ inches in length would with 350 turns of No. 14 enameled copper wire was found to be useful for uniformly magnetizing the magnetic recording member prior to imagewise demagnetization. This was accomplished by the passage of a direct current of 27 amperes which produced a field of 481 oersteds as measured by a Hall probe placed at the center of the coil. The field was somewhat greater near the edges of the aperture. A recording member containing a pattern of about 500 lines per inch filled with finely particulate chromium dioxide in a binder having a coercivity of about 440 oersteds, can thus be brought to magnetic saturation. A magnetic image can then be formed on the magnetic recording member by exposure to the radiation from a Xenon flash lamp. The same apparatus can then be used to invert the recorded image by a procedure whereby the recording member is again placed in the cavity of the aforementioned coil with the same orientation as it had when it was uniformly magnetized, and the direction of current flow through the coil now reversed. A current of 11 amperes was found to be required to bring about the magnetic inversion and the consequent optical image reversal.

FIG. 7 shows another form of apparatus which can be used to apply a magnetic field to a printing plate according to the process of the present invention. The field is generated by an electromagnetic consisting of iron core 40 in the form of a hollow cylinder of soft iron slotted longitudinally down one side. A coil of copper wire 41 is would around the core 40 as shown in FIG. 7. The ends of this coil are connected to a current supply (not shown). On passing the current through this coil 41 a magnetic field is generated in and around the slot of core 40. The recording member 42 is positioned as shown in FIG. 7 so that the magnetic layer thereof is in the fringe field of the electromagnet. The field is applied in sequence to each portion of the recording member by moving the recording member past the electromagnet or alternatively by moving the electromagnet past the recording member.

For convenience and in order to maintain a uniform spacing between the electromagnet and the magnetic printing plate, the electromagnet may be supported within a thin tube of a nonmagnetic alloy such as brass by bearings attached to the ends of the electromagnet so that the assembly can be rolled over the surface of the recording member.

Figure 8:
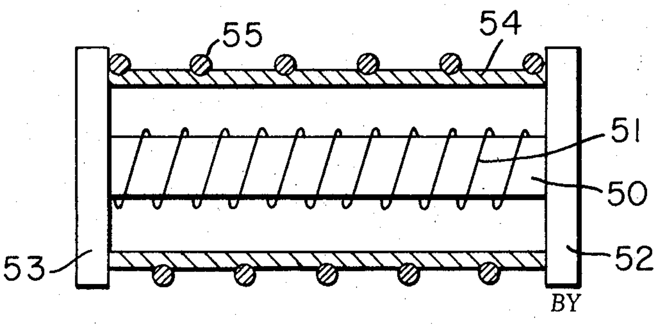
FIG. 8 illustrates yet another form of apparatus for applying a magnetic field to a magnetic recording member.

FIG. 8 shows yet another form of an electromagnet which can be used to apply a magnetic field to a magnetic recording member. This electromagnet comprises a soft iron core 50 on which is wound a coil of copper wire 51, the ends of which can be connected to a variable supply of electric current.

Two soft iron discs 52 and 53 are attached to the ends of the iron core and support a cylinder of a nonmagnetic material 54, such as aluminum, which thus encases the solenoid. The exterior wall of the aluminum cylinder has a spiral screw thread cut into its surface with a lathe and a continuous iron wire 55 is wound around said cylinder following the premachined threads and fastened to both end plates. The core of the solenoid 50, the end plates 52 and 53 and the iron wire 55 form a magnetic circuit which includes a large number of small air gaps between successive turns of the iron wire winding 55. Thus on passing a current through the winding 51 a magnetic field is generated in and around the air gaps in the magnetic circuit which is directed parallel to the axis of the assembly. The fields from the many air gaps of this electromagnet can be applied sequentially to each part of the magnetic material of a magnetic recording member as discussed hereinabove in connection with FIG. 7

DETAILED DESCRIPTION OF THE INVENTION

This invention is directed to the modification of magnetic images which have been performed on a magnetic recording member.

In the case of images composed of areas of magnetization of various degrees, but directed in a common direction, the effect of applying the magnetic field is to reverse the image in the sense that areas which formerly would print black, i.e., have the maximum magnetization, after treatment will print white, while former white-printing areas will now print black. Intermediate tones are likewise reversed. With recording members of this character, the process of the present invention can be applied repeatedly to obtain black on white or white on black images as desired.

The process of the present invention can also be applied to magnetic recording members wherein the image is formed initially of areas of reverse magnetization on a magnetized background. Either the background or the image areas can be demagnetized by application of the process of the invention while the areas of opposite magnetization will have the intensity of magnetization enhanced.

In the event that the areas of maximum magnetization which are enhanced are at the saturation level, no further enhancement can take place for those areas. Other areas magnetized in the direction of the applied field, which are magnetized to some degree below saturation, will, however, be enhanced in magnetization so that the application of the magnetic field in this instance will increase the contrast of the magnetic image. In this application, the process is not reversible in that the original condition of the recording member cannot be restored by repetition of the process with the field reversed.

The magnetic recording member on which the magnetic image is recorded as a pattern of magnetization must have as its magnetic working material a fairly particulate hard magnetic material. The particulate nature of the magnetic material limits the size of the magnetic domains of which the magnetic image is composed and thus is essential to the preservation of the magnetic image under the influence of the magnetic field.

The magnetic recording member is composed of a layer or stratum of the particulate hard magnetic material generally on a support of nonmagnetic material to which it is bound with a suitable binder according to techniques which are well known in the art. The stratum of magnetic material can be an essentially continuous layer such as that found in conventional magnetic recording tapes or it can be discontinuous and in a regular or irregular pattern. Patterned members are useful for recording magnetic images by reflex thermomagnetic recording techniques. The patterning is also advantageous in enhancing the magnetic field due to the imagewise pattern of magnetization on the recording member.

Any particulate hard magnetic material can be employed, depending on the method used for recording the magnetic image. For use in thermomagnetic recording, chromium dioxide is particularly preferred since it has excellent magnetic properties, has a low Curie temperature (from 70° C. to 170° C. depending on the modification employed) and, in finely particulate form, absorbs light throughout the visible region of the spectrum. Chromium dioxide including various modifications thereof which are generically known as chromium dioxide are described in U.S. Pats.: Arthur U.S. Pat. No. 2,956,955; Arthur & Ingraham U.S. Pat. No. 3,117,093; Cox U.S. Pat. No. 3,074,778, U.S. Pat. No. 3,078,147, U.S. Pat. No. 3,278,263; Ingraham & Swoboda U.S. Pat. No. 2,923,683, U.S. Pat No. 2,923,684, U.S. Pat. No. 3,034,988, U.S. Pat. No. 3,068,176 and Swoboda U.S. Pat. No. 2,923,685.

The magnetic image can be formed on the magnetic recording member by any suitable method. The manufacture of magnetic recording members having magnetic images thereon is known to those skilled in the art.

The magnetic field which is applied to change the pattern of magnetization should have a constant direction opposed to the direction of magnetization of those areas of the magnetic image which it is desired to demagnetize. The maximum intensity should be maintained constant over each part of the magnetic material of the magnetic recording member. The magnetic field can be applied simultaneously to each part of the magnetic printing plate, or a localized magnetic field can be scanned over the printing plate so that each portion of the recording member is exposed at least once to the same maximum magnetic field. The magnetic field changes the magnetic image only on the first exposure; subsequent exposure to the same magnetic field does not have any substantial effect, and is not expected to have any effect. It has been found, however, that several exposures to the modifying magnetic field appear to give a clearer image on printing with the recording member, although the difference is slight and is not susceptible to measurement.

The magnetic field must be unidirectional, but need not be of constant strength throughout the exposure, i.e., the field can be increased to a maximum and then decreased at any desired rate; likewise the time of exposure to maximum field is unimportant since the time required to modify the pattern of magnetization is extremely small.

The magnetic field should be sufficiently intense to demagnetize the most intensively magnetized portions of the pattern of magnetization forming the image. Since the process of the present invention is intended for use with magnetic recording members adapted to printing with magnetic pigments, precise demagnetization is not needed, i.e., the "demagnetized" areas may be weakly magnetized without substantially affecting the quality of the printed image. The attraction for particles of magnetic pigment does not depend on the direction of magnetization; accordingly, in the practice of this invention it is preferred to employ a magnetic field which has a maximum intensity somewhat greater than that required for exact demagnetization, since for a given "background" magnetization, the magnetic intensity of the magnetized portion of the changed image will be greater. Generally, the maximum strength of the magnetic field should be about equal to the coercivity of the magnetic material. Values of the magnetic field from about 90 percent to 150 percent of the coercivity can be usefully employed.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. The method of changing magnetic images composed of areas of differing magnetization on a magnetic recording member, the magnetic vector of each of said areas being aligned parallel to a predetermined line, said recording member having as its working magnetic medium a layer comprising finely particulate hard magnetic material, which comprises exposing each portion of said layer at least once to a unidirectional magnetic field directed along said predetermined line and having a constant maximum field strength about equal to the coercivity of said hard magnetic material and opposed in direction to at least some of the magnetic vectors of said areas.

2. The method of claim 1 in which the magnetic images are composed of areas of magnetization, the magnetic vector of each being aligned in a common direction parallel to a predetermined line, and areas of nonmagnetization.

3. The method of claim 1 in which the magnetic image comprises a first set of areas of magnetization, the magnetic vector of said first set of areas being aligned in a common direction parallel to a predetermined line and a second set of areas of magnetization, the magnetic vectors of said second set being aligned in a common direction parallel to said predetermined line but opposed to the magnetic vectors of said first set of areas.

4. The method of claim 1 wherein said finely particulate hard magnetic material is chromium dioxide.

5. The method of claim 2 wherein said finely particulate hard magnetic material is chromium dioxide.

6. The method of claim 3 wherein said finely particulate magnetic material is chromium dioxide.

* * * * *